US009922184B2

(12) United States Patent
Tokunaga et al.

(10) Patent No.: US 9,922,184 B2
(45) Date of Patent: Mar. 20, 2018

(54) INFORMATION PROCESSING APPARATUS

(71) Applicant: Sony Computer Entertainment Inc., Tokyo (JP)

(72) Inventors: Nodoka Tokunaga, Tokyo (JP); Keigo Tamura, Tokyo (JP); Shoichi Ikenoue, Tokyo (JP); Tomohiro Ogawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/915,988

(22) PCT Filed: Sep. 17, 2014

(86) PCT No.: PCT/JP2014/004775
§ 371 (c)(1),
(2) Date: Mar. 2, 2016

(87) PCT Pub. No.: WO2015/040859
PCT Pub. Date: Mar. 26, 2015

(65) Prior Publication Data
US 2016/0196417 A1      Jul. 7, 2016

(30) Foreign Application Priority Data

Sep. 18, 2013   (JP) .................... 2013-193282

(51) Int. Cl.
*H04L 29/06*      (2006.01)
*G06F 21/32*      (2013.01)
*G06K 9/00*       (2006.01)

(52) U.S. Cl.
CPC ......... *G06F 21/32* (2013.01); *G06K 9/00228* (2013.01); *G06K 9/00288* (2013.01); *G06K 9/00912* (2013.01)

(58) Field of Classification Search
CPC ....................................................... G06F 21/32
See application file for complete search history.

(56) References Cited

U.S. PATENT DOCUMENTS 8,818,055 B2     8/2014  Tsuji
2004/0062423 A1*  4/2004  Doi ................... G06F 21/32
                                                    382/118
(Continued)

FOREIGN PATENT DOCUMENTS

JP      2001043374 A      2/2001
JP      2008187591 A      8/2008
(Continued)

OTHER PUBLICATIONS

International Search Report for corresponding PCT Application No. PCT/JP2014/004775, 1 page, dated Dec. 22, 2014.
(Continued)

*Primary Examiner* — Jason K Gee
(74) *Attorney, Agent, or Firm* — Matthew B. Dernier, Esq.

(57) ABSTRACT

A taken-image display unit displays a taken image on a display. By use of face identification data held in a registered user information holding section, a face authentication unit detects a face image of a registered user existing in a taken image. A face frame processing unit displays a face frame on the display for the detected registered user. If, when the face frame is being displayed, the face authentication unit detects by use of the face identification data held in the user information holding section that the face image of the registered user is included in the face frame, a login processing unit lets this user log in.

10 Claims, 10 Drawing Sheets

(56) References Cited

U.S. PATENT DOCUMENTS

| | | | |
|---|---|---|---|
| 2007/0031010 A1 | 2/2007 | Sukegawa | |
| 2007/0266312 A1* | 11/2007 | Ayaki | G06K 9/228 |
| | | | 715/273 |
| 2008/0181460 A1* | 7/2008 | Tamaru | G06K 9/00248 |
| | | | 382/103 |
| 2010/0150450 A1 | 6/2010 | Tsuji | |
| 2011/0305394 A1* | 12/2011 | Singer | G06F 17/30265 |
| | | | 382/190 |
| 2012/0087636 A1 | 4/2012 | Kudo | |
| 2013/0015946 A1* | 1/2013 | Lau | G07C 9/00 |
| | | | 340/5.2 |
| 2013/0169839 A1* | 7/2013 | Takahashi | H04N 5/76 |
| | | | 348/231.99 |
| 2013/0169850 A1 | 7/2013 | Oyama | |

FOREIGN PATENT DOCUMENTS

| | | |
|---|---|---|
| JP | 2010141616 A | 6/2010 |
| JP | 2013141091 A | 7/2013 |

OTHER PUBLICATIONS

Office Action for corresponding JP Application No. 2013-193282, 11 pages, dated Nov. 22, 2016.

European Search Report for corresponding EP Application No. 14846437, 9 pages, dated Feb. 24, 2017.

\* cited by examiner

7

114

4

FIG.11
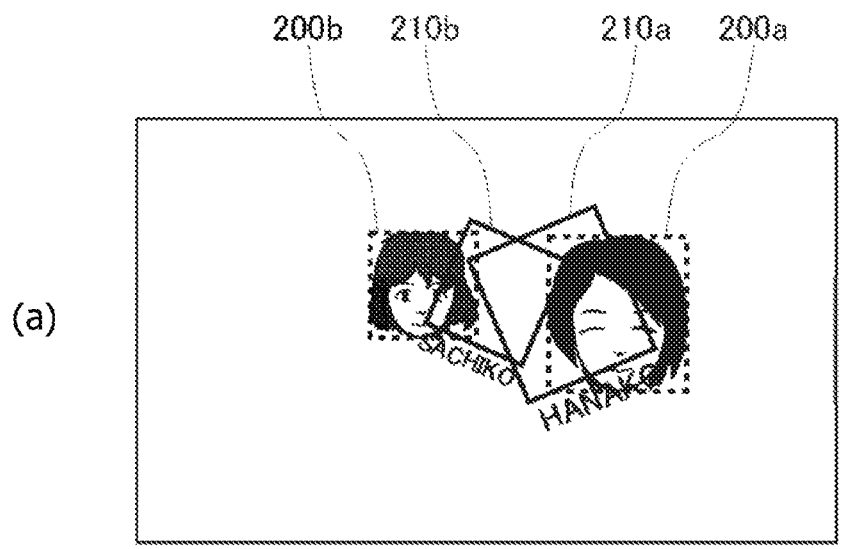
(a)
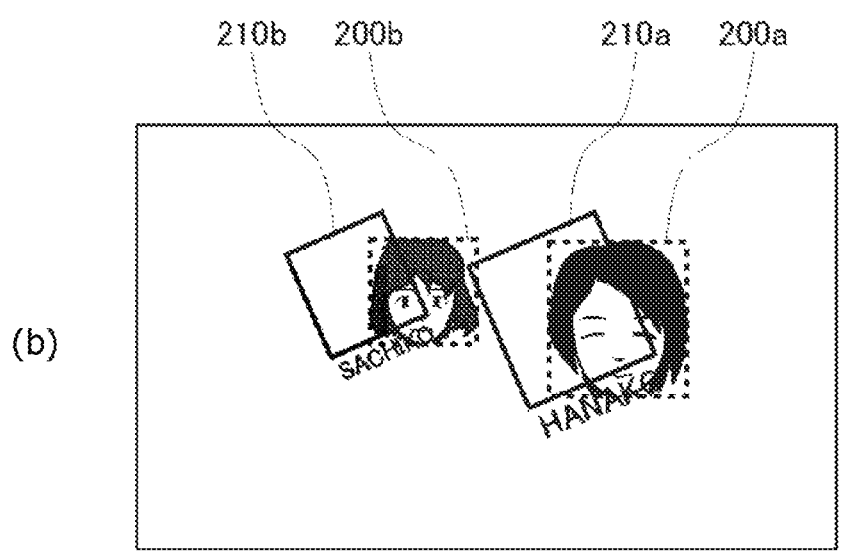
(b)

FIG.12
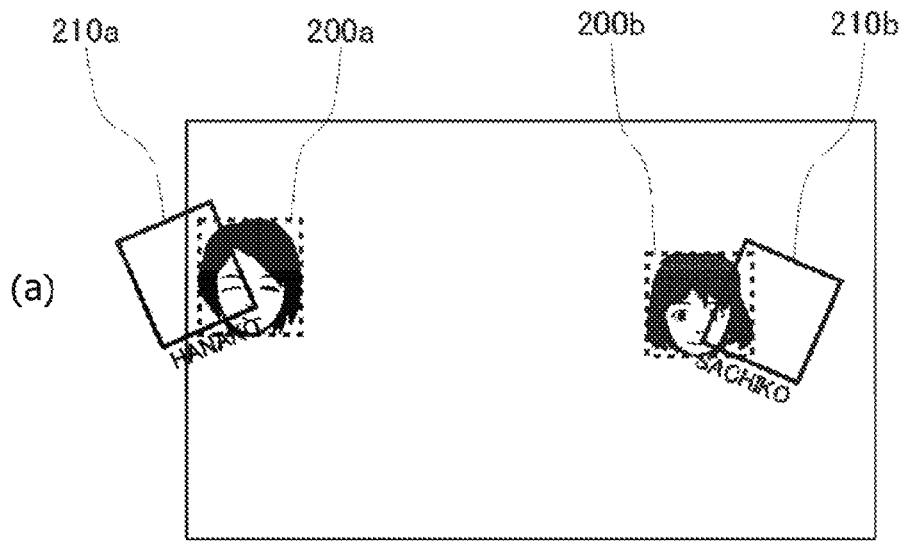
(a)
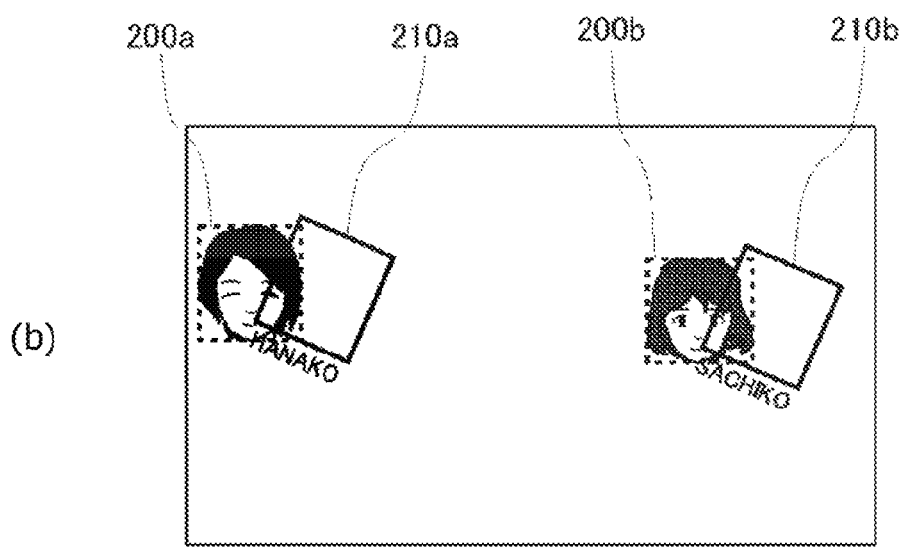
(b)

INFORMATION PROCESSING APPARATUS

TECHNICAL FIELD

The present invention relates to an information processing apparatus configured to execute user face recognition.

BACKGROUND ART

When a user logs in on an information processing apparatus such as a game apparatus, the information processing apparatus executes user authentication processing for identifying whether the login user is a user registered in advance or not. Various types of user authentication are available of which user authentication based on a password is widely used.

SUMMARY

Technical Problem

In addition to the password-based user authentication, the user authentication based on user's biological information is in general use. The user authentication based on biological information does not require a user to enter his or her password, thereby minimizing user's trouble in authentication. Especially, a face authentication system configured to recognize the face of a user from a digital image does not basically require a user to do a special operation, so that it is known as one of easy-to-use user authentication methods. The inventors hereof came to conceptualize a mechanism for a user to log in on an information processing apparatus by realizing user authentication in a simple way on the basis of a face authentication system.

Accordingly, it is an object of the present invention to provide a technology for executing user authentication.

Solution to Problem

In order to solve the above-mentioned problem, there is provided an information processing apparatus according to a mode of the present invention. This information processing apparatus includes: a taken-image display unit configured to display a taken image on a display; a registered user information holding section configured to hold data for face identification of a registered user; a face authentication unit configured to detect a face image of a registered user existing in a taken image by use of the face identification data held in the registered user information holding section; and a face frame processing unit configured to display a face frame on the display for the detected registered user. The face authentication unit detects that the face image of the registered user is included in the face frame by use of the face identification data held in the user information holding section.

It should be noted that any arbitrary combinations of the components described above and any conversions in the expression of the present invention between method, apparatus, system, recording medium, computer program and so on are also valid as modes of the present invention.

BRIEF DESCRIPTION OF DRAWINGS

FIG. 11(a) is a diagram illustrating a manner in which two face frames are overlapping each other, and (b) is a diagram illustrating a manner in which the overlapping of two face frames is resolved.

FIG. 12(a) is a diagram illustrating a manner in which a face frame partially gets out of a display, and (b) is a diagram illustrating a state in which the position of the face frame has been changed.

DESCRIPTION OF EMBODIMENT

Figure 1:
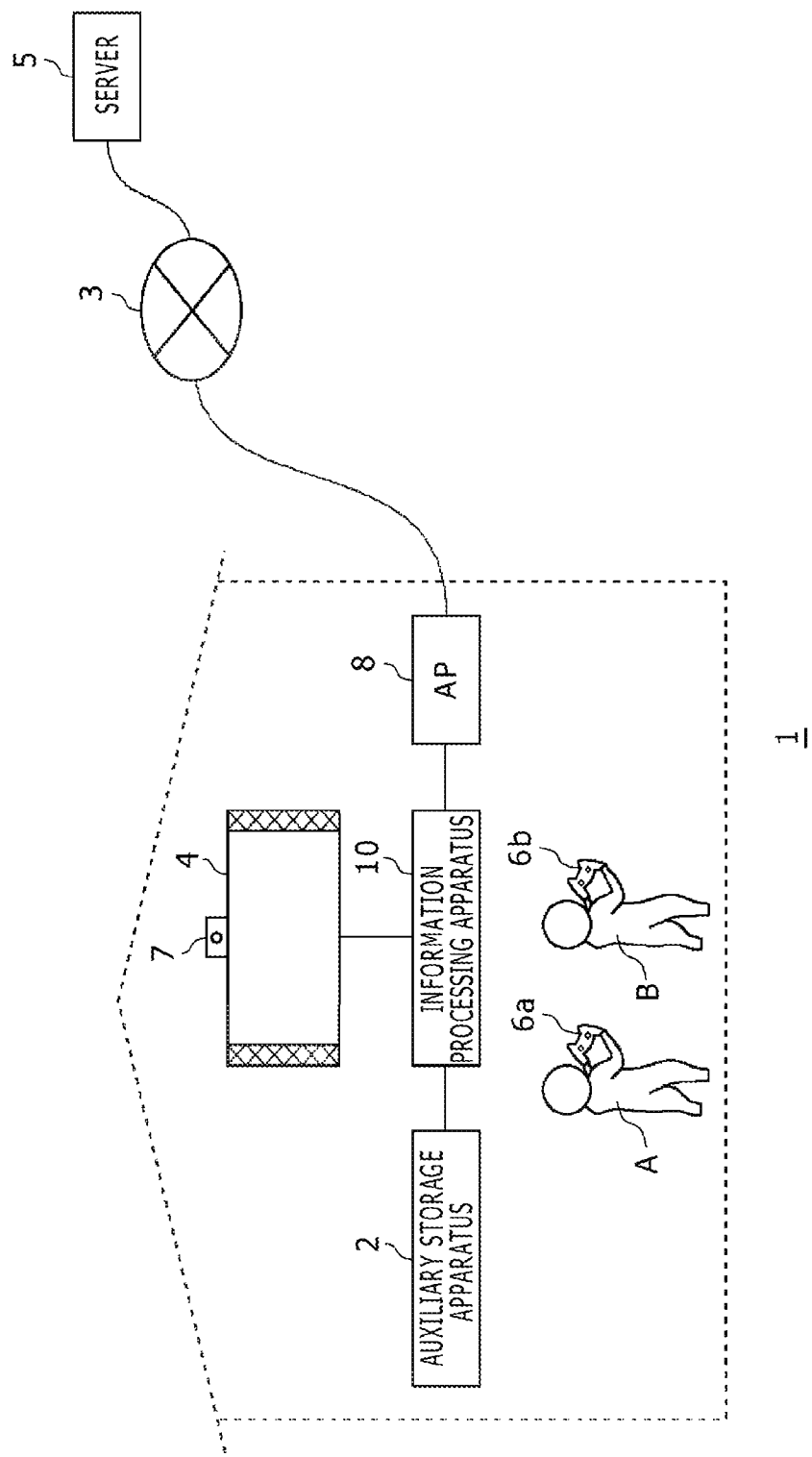
FIG. 1 is a diagram illustrating an information processing system according to one embodiment of the present invention.

Referring to FIG. 1, there is shown an information processing system 1 according to one embodiment of the present invention. The information processing system 1 has an information processing apparatus 10 that is a user terminal and a server 5. An access point (hereafter referred to as "AP") 8 has the functions of a wireless access point and a router. The information processing apparatus 10 is connected to the AP 8 in a wireless or wired manner, thereby being communicably connected to the server 5 on a network 3.

An auxiliary storage apparatus 2 is a mass storage apparatus such as an HDD (Hard Disk Drive) or a flash memory, which may be an external storage apparatus connected to the information processing apparatus 10 through USB (Universal Serial Bus) or a built-in storage apparatus. An output apparatus 4 may be a television set having a display for outputting images and a speaker for outputting audio or may be a computer display. The output apparatus 4 may be connected to the information processing apparatus 10 with a wired cable or in a wireless manner. The information processing apparatus 10 is connected in a wired or wireless manner to an input apparatus 6 that is operated by a user, the input apparatus 6 outputting operation signals indicative of results of user operations to the information processing apparatus 10. Receiving an operation signal from the input apparatus 6, the information processing apparatus 10 reflects the received operation signal onto the processing of an OS (system software) or an application and has the output apparatus 4 output a processing result. The input apparatus 6 is configured by two or more input units such as two or more push-type operation buttons, an analog stick for entering analog quantity, and a rotary button.

Receiving an operation signal from the input apparatus 6, the information processing apparatus 10 reflects the received operation signal onto the processing of an application and has the output apparatus 4 output a processing result. The information processing apparatus 10 in the information processing system 1 is a game apparatus that executes a game and the input apparatus 6 is a device configured to provide an operation signal by the user to the information processing apparatus 10 such as a game controller. It should be noted that the input apparatus 6 may be an input interface such as a keyboard or a mouse. A camera 7 that is an image taking apparatus is arranged in the proximity of the output apparatus 4 to take images of spaces around the output apparatus 4. In FIG. 1, an example is shown in which the camera 7 is mounted on top of the output apparatus 4 and it is also practicable to mount the camera 7 at a side of the output apparatus 4; in any case, the camera 7 is arranged at a position where it can take images of the user located in front of the output apparatus 4. The camera 7 may be a stereo camera.

The server 5 provides network services to users of the information processing system 1. The server 5 manages the network account for identifying each user who signs in on the network services provided by the server 5 by use of the network account. By signing in on network services from the information processing apparatus 10, the user is able to make registration of game save data and trophies that are virtual prizes won in game plays.

FIG. 1 shows a manner in which two users A and B are operating input apparatuses 6a and 6b that are game controllers. Respectively operating the input apparatuses 6a and 6b, the users A and B enter login passcodes and, upon successful authentication by the information processing apparatus 10, can log in on the OS of the information processing apparatus 10 to enjoy an application such as a game.

Recently, games have been marketed in which the movement of a user is reflected onto the movement of a character. With a game in which user gestures are used, there is no need for the user to have the input apparatus 6 and therefore the user can move a character in an intuitive manner. In such a game, since the user need not use the input apparatus 6 from the beginning, it is desirable for the user to have user authentication without use of the input apparatus 6 in logging in on the OS of the information processing apparatus 10. It should be noted that, regardless of the type of a game to be played by the user after the login, it is significant in the information processing system 1 that the user can log in after simple user authentication.

Therefore, the information processing system 1 of the present embodiment provides a technology of easily executing user authentication by use of images taken by the camera 7.

Figure 2:
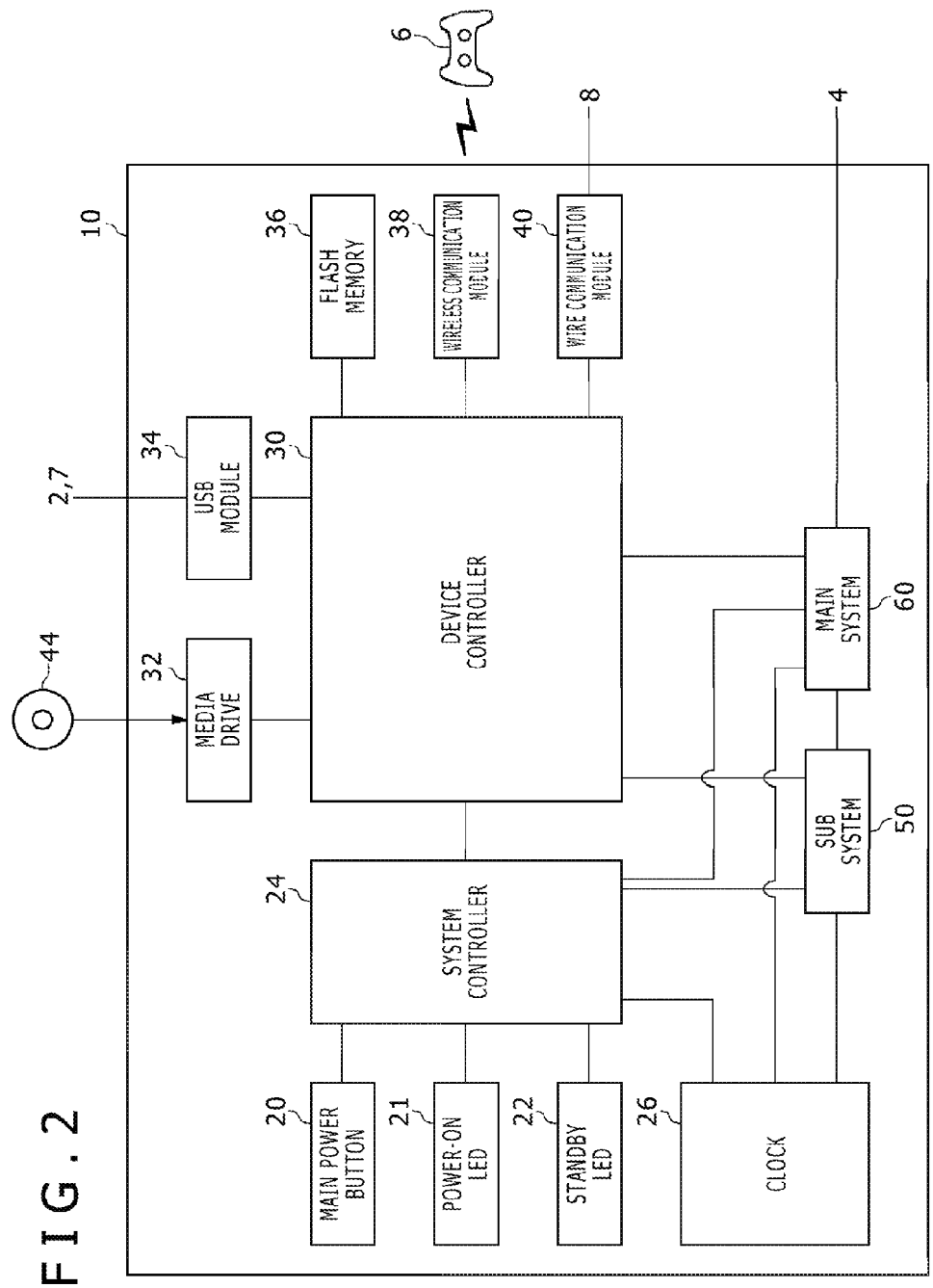
FIG. 2 is a block diagram illustrating functions of an information processing apparatus.

Referring to FIG. 2, there is shown a functional block diagram of the information processing apparatus 10. The information processing apparatus 10 is configured by including a main power button 20, a power-on LED 21, a standby LED 22, a system controller 24, a clock 26, a device controller 30, a media drive 32, a USB module 34, a flash memory 36, a wireless communication module 38, a wire communication module 40, a sub system 50, and a main system 60.

The main system 60 has a main CPU (Central Processing Unit), a memory that is a main storage apparatus and a memory controller, a GPU (Graphics Processing Unit), and the like. The GPU is mainly used for arithmetic processing of game programs. These functions may be configured as a system-on-chip and formed on one chip. The main CPU has a function of starting up the OS and executing applications installed in the auxiliary storage apparatus 2 in an environment provided by the OS.

The sub system 50 has a sub CPU, a memory that is a main storage apparatus, a memory controller, and the like but has no GPU. The number of sub CPU circuit gates is smaller than the number of main CPU circuit gates and the operation power dissipation of the sub CPU is less than that of the main CPU. As described above, the sub CPU operates while the main CPU is in a standby state and is therefore restricted in the processing function thereof in order to minimize the power dissipation. It should be noted that the sub CPU and the memory may be formed on different chips.

The main power button 20 is an input unit on which the user executes operation input, arranged on a front surface of a housing of the information processing apparatus 10, and operated to turn on or off the power to the main system 60 of the information processing apparatus 10. In the following description, that the main power is on denotes that the main system 60 is in an active state; that the main power is off denotes that the main system 60 is in a standby state. The power-on LED 21 is turned on when the main power button 20 is turned on and the standby LED 22 is turned on when the main power button 20 is turned off.

The system controller 24 detects the pressing of the main power button 20 by the user. When the main power button 20 is pressed with the main power being off, the system controller 24 gets this pressing operation as "on-instruction"; on the other hand, when the main power button 20 is pressed with the main power being on, the system controller 24 gets this pressing operation as "off-instruction."

While the main CPU has a function of executing a game program installed in the auxiliary storage apparatus 2 or a ROM medium 44, the sub CPU has no such a function. However, the sub CPU has a function of accessing the auxiliary storage apparatus 2 and a function of transmitting and receiving data to and from the server 5. The sub CPU is configured having only these restricted processing functions and therefore can operate on a small power dissipation as compared with the main CPU. These sub CPU functions are executed when the main CPU is in a standby state. The information processing apparatus 10 in the present embodiment maintains a state in which it is always signed in on the network services provided by the server 5 because the sub system 50 is operating while the main system 60 is in a standby state.

The clock 26 is a realtime clock to generate current date and time information and supplies the generated current date and time information to the system controller 24, the sub system 50, and the main system 60.

The device controller 30 is configured as an LSI (Large-Scale Integrated Circuit) that executes the transfer of information between devices like a south bridge. As shown in the figure, the device controller 30 is connected to devices such as the system controller 24, the media drive 32, the USB module 34, the flash memory 36, the wireless communication module 38, the wire communication module 40, the sub system 50, and the main system 60. The device controller 30 absorbs differences in electric characteristics and data transfer speeds between devices, thereby controlling data transfer timing.

The media drive 32 is a drive unit that loads and drives the ROM medium 44 recorded with application software such as games and license information and reads programs and data from the ROM medium 44. The ROM medium 44 is a read-only recording medium such as an optical disc, a magneto-optical disc, and a Blu-ray disc.

The USB module 34 is a module configured to provide connection with an external device through a USB cable. The USB module 34 may be connected to the auxiliary storage apparatus 2 and the camera 7 via a USB cable. The flash memory 36 is an auxiliary storage apparatus that makes up an internal storage. The wireless communication module 38 communicates with the input apparatus 6 for example in a wireless manner by use of a communication protocol such as Bluetooth (trademark) protocol and IEEE802.11 protocol. It should be noted that the wireless communication module 38 may be compliant with the third-generation (3rd Generation) digital mobile telephone scheme based on the IMT-2000 (International Mobile Telecommunication 2000) standard defined by the ITU (International Telecommunication Union) or, further, digital mobile telephone schemes of other generations. The wire communication module 40 communicates with an external device in a wired manner and connected to the network 3 via the AP 8 for example.

In the information processing system 1 of the present embodiment, if the user presses the main power button 20 with the information processing apparatus 10 powered off, the information processing apparatus 10 turns on the main power to activate the OS (system software), thereby executing the login processing for the user who does not use the input apparatus 6. In this login processing, the information processing apparatus 10 functions as a face authentication system based on an image taken by the camera 7. The following describes an operation of the information processing apparatus 10.

Figure 3:
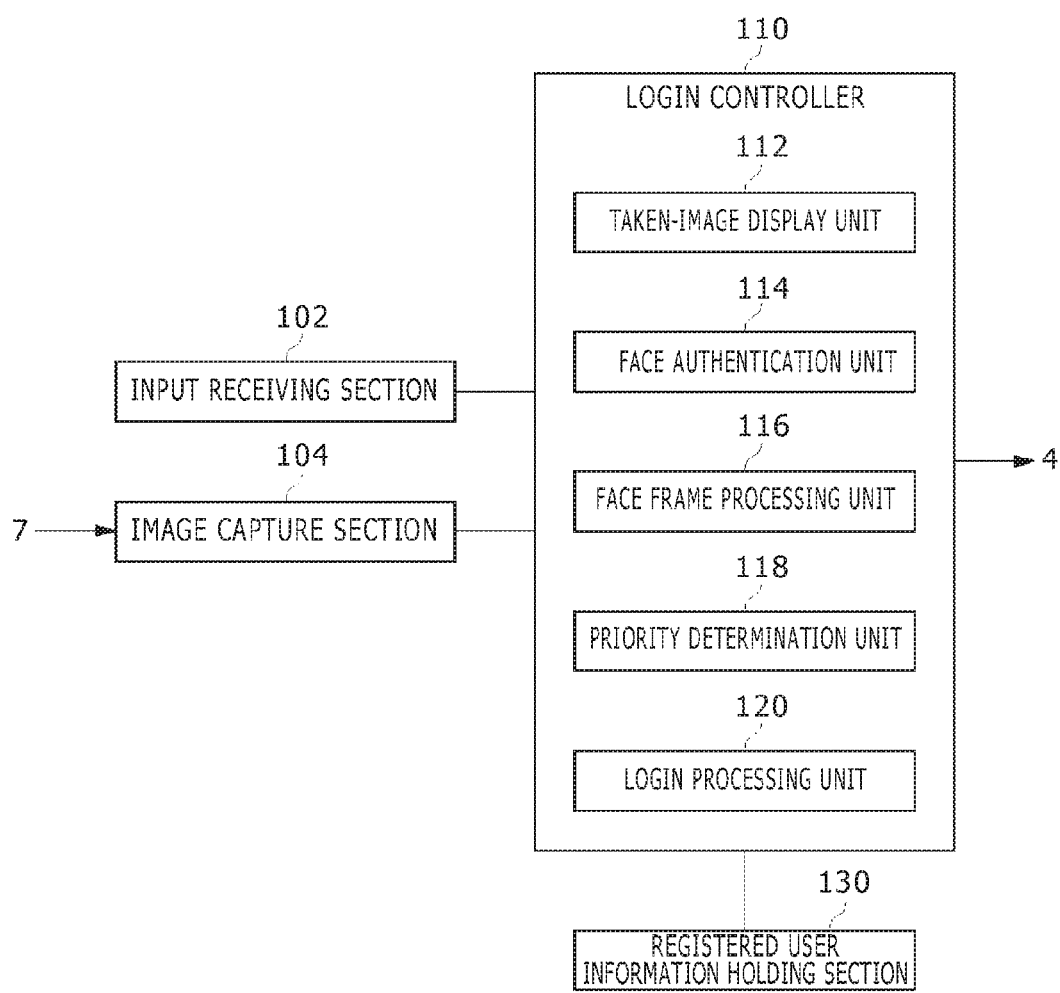
FIG. 3 is a diagram illustrating an internal configuration of the information processing apparatus.

Referring to FIG. 3, there is shown an internal configuration of the information processing apparatus 10. The information processing apparatus 10 has an input receiving section 102, an image capture section 104, a login controller 110, and a registered user information holding section 130. The login controller 110 has a taken-image display unit 112, a face authentication unit 114, a face frame processing unit 116, a priority determination unit 118, and a login processing unit 120. The input receiving section 102 accepts operation information from the user and the image capture section 104 captures images taken by the camera 7. The camera 7 takes space images in a predetermined period, one space image every ⅟30 second for example, and provides the taken-images to the image capture section 104. The camera 7 is arranged such that the optical axis thereof is directed toward the front of the output apparatus 4 and therefore the camera 7 takes the user who is present in the front of the output apparatus 4.

In FIG. 3, components described as functional blocks that execute various kinds of processing can be configured by circuit blocks, memories, and other LSIs in terms of hardware and realized by programs or the like stored in the memory in terms of software. Therefore, it is understood by those skilled in the art that these functional blocks can be realized in a variety of ways by only hardware, only software, or combinations thereof and there is no restriction to the above-mentioned types of realization. In the present embodiment, the functions of the taken-image display unit 112, the face frame processing unit 116, and the priority determination unit 118 are realized by a face authentication application and the function of the face authentication unit 114 is realized by a face recognition engine, which are automatically activated by the OS upon pressing of the main power button 20. It should be noted that the face authentication application and the face recognition engine may be configured as one application.

One of the features of the information processing apparatus 10 in the present embodiment is the support of a simple login operation of the user. In order to log in on the OS of the information processing apparatus 10, it is necessary for the user to get a user account in advance and register the obtained user account into the information processing apparatus 10. In what follows, the user who has registered the user account in the information processing apparatus 10 is referred to as a "registered user."

The registered user information holding section 130 holds various kinds of information related with each registered user and, to be more specific, holds, as registered user information, face identification data, a user online ID (nickname on network), and a login passcode in association with a user account. Face identification data here is feature quantity data of a face image of each registered user but may be face image data itself. Face identification data is data to be compared in the face recognition processing by the face authentication unit 114 and is generated in accordance with a face recognition algorithm employed by the face authentication unit 114. For example, face identification data may be data that is obtained by extracting the relative position and size of facial parts and the shapes of the eyes, nose, cheek bones, and jaw as features. Further, face identification data may be data that is obtained by extracting difference data from standard data of face images. Which piece of the face identification data is to be extracted is dependent on a face recognition algorithm employed; in the present embodiment, the face authentication unit 114 employs a known face recognition algorithm.

In what follows, it is assumed that registered user information of at least users A and B be stored in the registered user information holding section 130 and the online ID of user A be "HANAKO" and the online ID of user B be "SACHIKO."

The following describes processing to be executed when a registered user logs in on the OS of the information processing apparatus 10. In this login processing, the user logs in without use of the input apparatus 6.

When the user presses the main power button 20 of the information processing apparatus 10, the main power of the information processing apparatus 10 is turned on, upon which the input receiving section 102 receives the main power pressing information as a login request from the user. When the input receiving section 102 receives the login request, each function in the login controller 110 is realized. The login controller 110 has a function of deciding whether to permit the login of the user on the basis of a result of user face recognition.

When the input receiving section 102 receives the login request based on the pressing of the main power, the taken-image display unit 112 displays a taken image acquired by the image capture section 104 onto the output apparatus 4 that is a display. Consequently, a live image taken by the camera 7 is displayed on the output apparatus 4, thereby displaying the user existing in the front of the output apparatus 4 on the output apparatus 4.

Figure 4:
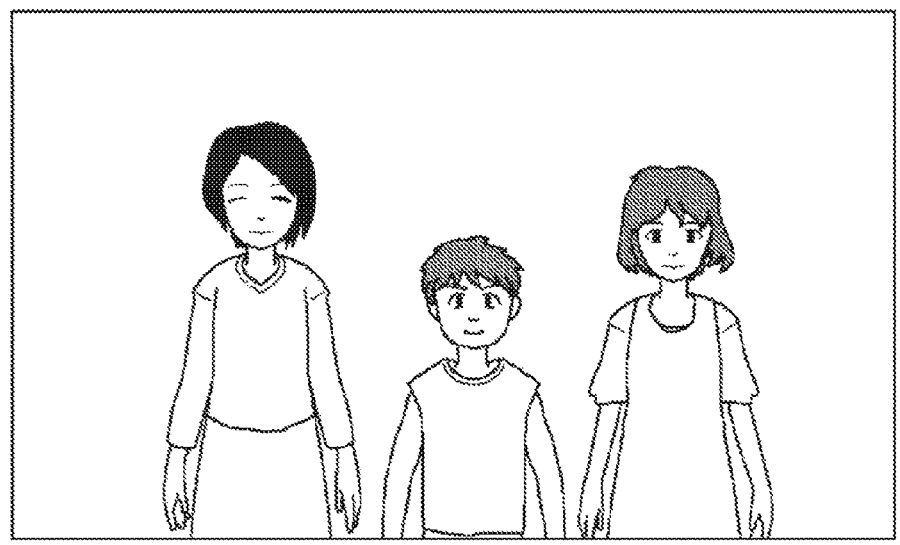
FIG. 4 is a diagram illustrating one example of a space taken by a camera.

Referring to FIG. 4, there is shown one example of a space taken by the camera 7. In this taken-image space, there are three users. As shown in FIG. 4, a square frame enclosing the users is representative of an image taking range of the camera 7. For the image taking range of the camera 7, a range displayed as a live image on the output apparatus 4 is assumed; the live image may be part of a taken image. The face authentication unit 114 extracts part estimated as a human face from the taken image, derives the feature quantity data of that part, and compares the derived data with the face identification data held in the registered user information holding section 130, thereby determining that the extracted face is the face of a registered user.

To be more specific, the face authentication unit 114 derives the degree of matching between the feature quantity data of the extracted face image of the user and the face identification data of all registered users held in the registered user information holding section 130. This degree of matching is numerically represented; for example, the degree of matching is derived in the form of the number of points out of a hundred. If the degree of matching with the feature quantity data of a registered face image is 90 points or higher, then the face authentication unit 114 determines that the image-taken user is a registered user and identifies which registered user is the image-taken user. It should be noted that, if there are two or more pieces of feature quantity data of which degree of matching exceeds 90 points, the face authentication unit 114 may determine that the image-taken user is a registered user of the face identification data for which a maximum point has been derived. It should be noted that, if there is no feature quantity data of which degree of matching exceeds 90 points as a result of the derivation of the degrees of matching between the feature quantity data of a user face image extracted from a taken image and the face identification data of all registered users, the face authentication unit 114 determines that the user included in the taken image is not a register user. Thus, by use of the face identification data held in the registered user information holding section 130, the face authentication unit 114 detects a face image of each registered user existing in a taken image. For this face identification technology, a known technology may be used. In the present embodiment, this processing is positioned as a first phase face authentication.

Figure 5:
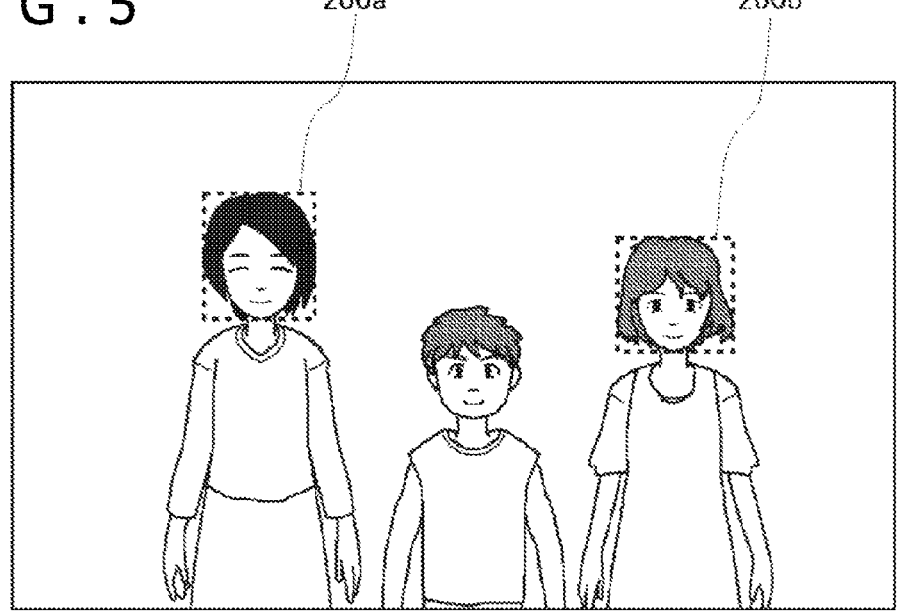
FIG. 5 is a diagram illustrating a result of face identification by a face authentication unit.

Referring to FIG. 5, there is shown a result of the face identification executed by the face authentication unit 114. It is determined here that the user on the left is user A, the user on the right is user B, and the user at the center is not a registered user. The face authentication unit 114 sets a face region 200*a* indicative of the position of the face of user A (online ID: HANAKO) in the taken image and a face region 200*b* indicative of the position of the face of user B (online ID: SACHIKO) in the taken image and provides the positional coordinates of the face regions 200*a* and 200*b* and the information for identifying the imaged registered users to the face frame processing unit 116. In what follows, an example is shown in which the positional coordinates are expressed by two-dimensional coordinates employed when a taken image is displayed on the display; it is also practicable that the positional coordinates are coordinates defined in VRAM. In any case, the coordinates of the face regions 200 and the coordinates of a face frame which will be described later have only to be expressed on a common coordinate system.

Each face region 200 may be set as a rectangular area that touches the outline of a face in a taken image or as a rectangular area that is slightly larger than a face outline. It should be noted that here the outline of a face denotes the outline including the hair; it is also practicable to set the outline of a face without the hair if the face recognition processing by the face authentication unit 114 does not consider the hair. The size and shape of the face region 200 are determined by the size and shape of the face of a user in a taken image, so that the size and shape of the face region 200 differ from user to user and, even in the case of a same user, the size and shape of the face region 200 vary depending on the distance from the camera 7.

The information for identifying a registered user provided from the face authentication unit 114 to the face frame processing unit 116 may be the user account of a registered user or the online ID thereof. The face authentication unit 114 provides the positional coordinates of the face region 200 and registered user identification information to the face frame processing unit 116 by relating these items of information with each other, namely, in the example shown in FIG. 5, a combination of the face region 200*a* and user A identification information and a combination of the face region 200*b* and user B identification information to the face frame processing unit 116.

The face frame processing unit 116 displays a face frame on the output apparatus 4 for the registered user detected by the face authentication unit 114. This face frame is displayed so that the registered user can move and arrange the face with respect to the face frame when logging in. Therefore, putting the face of the registered user into the face frame displayed on the output apparatus 4, the registered user is able to log in on the information processing apparatus 10.

Figure 6:
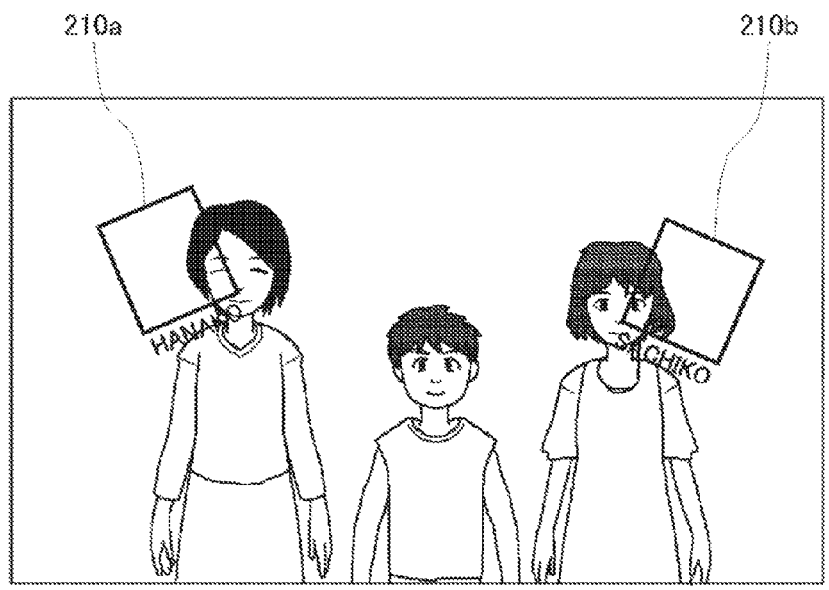
FIG. 6 is a diagram illustrating a login screen including a face frame to be displayed on an output apparatus.

Referring to FIG. 6, there is shown a login screen that includes face frames to be displayed on the output apparatus 4. On the basis of the positional coordinates of the face region 200*a* and the face region 200*b* supplied from the face authentication unit 114 and the information for identifying image-taken registered users, the face frame processing unit 116 displays face frames 210 for the registered users. Here, a face frame 210*a* is displayed for user A and a face frame 210*b* for user B. At this time, the face frame processing unit 116 displays the online ID of user A in the proximity of the face frame 210*a* and the online ID of user B in the proximity of face frame 210*b*. Consequently, users A and B are able to know that the face recognition of themselves has been properly done and then move the faces to the face frame 210*a* and the face frame 210*b*, respectively. It should be noted that, if an online ID of another user is displayed in the proximity of the face frame 210 displayed in the proximity of the own face, the user is able to know that the face recognition has not been done properly and therefore does not do an operation of moving the face into the face frame 210. It should be noted that, because the user at the center is not a registered user, the face frame 210 is not displayed for this user.

The face frame processing unit 116 attaches an ID to each face frame 210 and provides the face frame IDs, the positional coordinates of the face frame 210, and the identification information of the user for whom the face frame 210 is displayed to the face authentication unit 114. It should be noted that the positional coordinates of the face frame 210 to be provided by the face frame processing unit 116 to the face authentication unit 114 may be the positional coordinates of the face frame 210 itself or the rectangular coordinates circumscribing the face frame 210. In what follows, the positional coordinates of the face frame 210 itself and the positional coordinates of the rectangular circumscribing the face frame 210 are generically referred to as face frame positional coordinates. Face frame positional coordinates are used to detect a user face image in the face authentication unit 114.

For example, the face frame processing unit 116 sets the face frame ID of the face frame 210*a* to "ID1" and the face frame ID of the face frame 210*b* to "ID2" and provides a combination of "ID1," the positional coordinates of the face frame 210*a* and the identification information of user A and a combination of "ID2," the positional coordinates of the face frame 210*b* and the identification information of user B to the face authentication unit 114. In addition, the face frame processing unit 116 provides the face frame ID and the identification information of the user for whom the face frame 210 is displayed to the login processing unit 120. Therefore, here, the face frame processing unit 116 provides a combination of "ID1" and the identification information of user A and a combination of "ID2" and the identification information of user B to the login processing unit 120.

Figure 7:
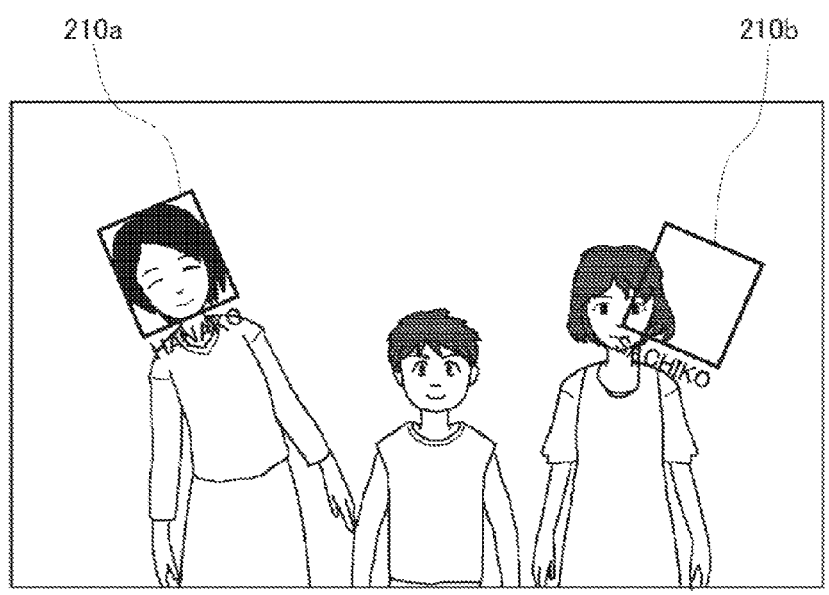
FIG. 7 is a diagram illustrating a login screen with face put in a face frame by a user.

Referring to FIG. 7, there is shown a login screen with a user face put in a face frame. Here, the login screen shows a manner in which user A moves his or her face and body so as to put the face into the face frame 210*a* displayed on the output apparatus 4. The face authentication unit 114 monitors whether a human face is in the face frame 210; if the face is found in the face frame 210, then, by use of the face identification data held in the registered user information holding section 130, the face authentication unit 114 determines whether the face in the face frame 210 is the face of a registered user.

The face authentication unit 114 can monitor whether a human face is in the face frame 210 on the basis of the positional coordinates of the face frame 210 provided from the face frame processing unit 116. The face recognition algorithm is as described before and, if the face authentication unit 114 estimates that a human face is included in the face frame 210, the face authentication unit 114 derives the feature quantity data of that portion and compares the derived feature quantity data with the face identification data held in the registered user information holding section 130, thereby determining that the extracted face is the face of a register user. It should be noted that the face authentication unit 114 has received a combination of the face frame ID, the positional coordinates of the face frame 210, and the identification information of the user for whom the face frame 210 is displayed from the face frame processing unit 116 and compares the feature quantity data of a human face image included in the face frame 210 with the user face identification data with the face frame 210 displayed. Because the face authentication unit 114 is notified of a user to be included in the face frame 210 in advance, the face authentication unit 114 need not compare the feature quantity data of the face included in the face frame 210 with the face identification data of all registered users, thereby executing face recognition processing with efficiency. At this moment, the face authentication unit 114 may determine that the face of a registered user has been put in the face frame 210 by detecting that the face of the registered user has been in the face frame 210 for a predetermined time (several seconds for example).

In the example shown in FIG. 7, the face authentication unit 114 determines that the face in the face frame 210*a* is the face of user A. In the present embodiment, this processing is positioned as a second phase face authentication. The first phase and second phase face authentication completes the user authentication at the time of login. The act of user's putting the face into the face frame 210 is executed on the basis of user's intention to log in and, if the user does not want log in, the face may not be put in the face frame 210. Thus, in the present embodiment, the first phase face authentication detects a registered user who will possibly log in and the second phase face authentication detects a registered user who has intention to log in. A registered user can be authenticated only by executing a simple operation of putting his or her face into the face frame 210. The user operation load can be thereby minimized at the time of login.

Upon detection that the face of user A is in the face frame 210*a*, the face authentication unit 114 notifies the login processing unit 120 of the face frame ID for identifying the face frame 210*a* and the user identification information for identifying user A. As described above, the login processing unit 120 is notified of the face frame ID and the identification information of the user for whom the face frame 210 is displayed from the face frame processing unit 116 in advance. Upon receiving the face frame ID and the user identification information from the face authentication unit 114, the login processing unit 120 extracts user identification information related with the face frame ID received from the face frame processing unit 116, thereby determining a match between these pieces of user identification information. Here, both pieces of information received for the face frame ID of ID 1 are the identification information of user A, so that the login processing unit 120 recognizes the detection of the face of user A in the face frame 210*a* displayed for user A. Consequently, the login processing unit 120 allows user A to log in on the information processing apparatus 10.

It should be noted that, in the example described above, the face authentication unit 114 compares the face identification data for one user expected to be included in the face frame 210 with the feature quantity data of a face included in the face frame 210; it is also practicable to compare the face identification data of all registered users with the feature quantity data of the face included in the face frame 210. As a result, the face authentication unit 114 may sometimes detects the face of a registered user other than user A in the face frame 210*a* displayed for user A. The face authentication unit 114 notifies the login processing unit 120 of the user identification information for identifying the user included in the face frame 210 and the face frame ID, and the login processing unit 120 compares the notified face frame ID and identification information with the face frame ID and the identification information of the user for whom the face frame 210 is displayed that are in advance received from the face frame processing unit 116 in advance. If, for the same face frame ID, the identification information of a user for whom the face frame 210 is displayed and the identification information of a user actually detected in the face frame 210 are different from each other, namely, if the face of a registered user other than user A is detected in the face frame 210*a* displayed for user A, then the login processing unit 120 determines that the face image detected in the face frame 210*a* is not the face of user A and thus does not allow user A or a registered user whose face is in the face frame 210*a* to log in.

As described above, in the present embodiment, the login controller 110 allows a registered user to log in after the user authentication of two phases of face authentication. For example, in the first phase face authentication processing, after a human face is detected in the first taken image and whether or not the detected face is that of a registered user is determined, no face authentication processing need be executed unless a new user is imaged. It should be noted that, in this case, the face of a detected person is traced in a taken image and the positional coordinates of the face image in the taken image are constantly provided to the face frame processing unit 116. It should also be noted that face authentication may be executed in a predetermined period and the face of the detected person may be traced in a time zone in which face authentication is not executed. After one registered user logs in by the second phase face authentication processing, if there is another registered user who has not logged in but has been imaged, the login screen may be kept displayed until the registered user logs in. At this moment, it is desirable for the face frame processing unit 116 to delete the face frame 210 displayed for the login user from the output apparatus 4. It should be noted that, if the number of registered users who can log in by this face authentication is restricted to one person, then, after login of one registered user, the login screen may be transitioned to the home screen for example provided by the OS of the information processing apparatus 10. It should also be noted, if, after the face frame 210 is displayed in the login screen, the face authentication unit 114 cannot detect any face in the face frame 210 for a predetermined period of time, then the login processing by face authentication may be ended to transition to the login processing by use of the input apparatus 6. If the user does not want the login processing by face authentication, then the login processing by the face authentication may be ended, for example using the input apparatus 6, to transition to the login processing by use of the input apparatus 6.

The information processing apparatus 10 of the present embodiment allows each user to log in by the face authentication made up of two phases. The following describes display modes of the face frame 210. It should be noted that, in FIGS. 8 through 13, only the faces of registered users A and B included in a taken image are displayed and the display of the body parts other than the face and other users is omitted for the purpose of illustration.

The face frame processing unit 116 displays the face frame 210 for a registered user on the basis of the positional coordinates of the face region 200a and face region 200b provided from the face authentication unit 114 and the information for identifying an image-taken registered user. The positional coordinates of the face region 200 provided from the face authentication unit 114 may be the coordinate values of four vertices of the face region 200 set as a rectangle for example.

Figure 8:
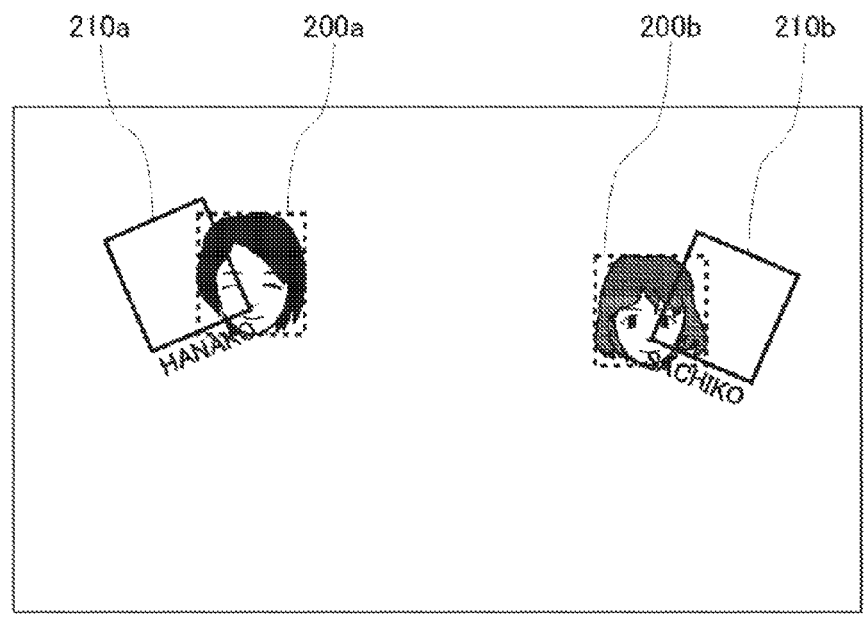
FIG. 8 is a diagram illustrating a relation between a face region and a face frame.

Referring to FIG. 8, there is shown a relation between the face region 200 and the face frame 210. It should be noted that, in the output apparatus 4, the dashed lines indicative of the face region 200 are not actually displayed; however, here, in order to describe the relation between the face region 200 and the face frame 210, the dashed lines of the face region 200 are displayed. It should be noted that it does not necessarily mean that the dashed lines of the face region 200 should not be displayed; needless to say, these lines may be displayed.

The face frame processing unit 116 displays the face frame 210 at a location where it is easy for a user to put in his or her face and, if the user has no intention to put in his or her face, the face is not entered. In the example shown in FIG. 8, the face frame processing unit 116 arranges the face frame 210 such that part of the face frame 210 overlaps the face image of a registered user displayed on the output apparatus 4. Consequently, the face frame 210 is arranged at a location where it is easy for the user to put in his or her face and, at the same time, a registered user can easily recognize which face frame 210 he or she is to put the face in. In addition, the face frame processing unit 116 displays the face frame 210 at a predetermined angle relative to the vertical direction of the face region 200. This prevents a user from putting his or her face in the face frame 210 unless the user intentionally tilts the head, thereby reducing the possibility of accidental entering of the face of a user not intended for login into the face frame 210.

In accordance with the size of the face image of a registered user detected in the login screen, namely, the size of the face region 200, the face frame processing unit 116 sets the size of the face frame 210. The size of the face frame 210 may be the same as the size of the face region 200; it is desirable for the size of the face region 200 at least to fit in the face frame 210. Because the face frame 210 is displayed at an angle relative to the face region 200, displaying the face frame 210 slightly larger than the face region 200 facilitates a user to put his or her entire face into the face frame 210.

It should be noted that the face frame processing unit 116 may determine the display position of the face frame 210 on the basis of user physical features. For example, there is a stroke difference in head tilting between short and tall persons; namely, a tall person can tilt his or her head more largely than a short person. Therefore, the registered user information holding section 130 may hold the height of each user as registered user information in advance and the face frame processing unit 116 may determine the angle of the face frame 210 relative to the vertical direction of the face region 200 in accordance with the height of each registered user. In this case, the setting is made such that the tilt angle of the face frame 210 is larger for a taller person than a smaller person. It is also set that the ratio of overlapping between the face frame 210 and the face region 200 is smaller for a taller person than a smaller person. Thus, the face frame processing unit 116 may determine the display location of the face frame 210 for each registered user on the basis of the physical features of each registered user.

Further, in displaying the face frame 210 for two or more registered users, the face frame processing unit 116 displays two or more face frames 210 such that these face frames 210 do not overlap with each other. In the example shown in FIG. 8, the face frame 210a for user A and the face frame 210b for user B are not overlapping with each other. If there is an overlap between the face frame 210a and the face frame 210b, then, if user A and user B want to put the faces thereof into the face frame 210a and the face frame 210b, respectively, there is a possibility of collision of their heads. Therefore, it is desirable to display two or more face frames 210 without overlapping with each other.

In order to display two or more face frames 210 so as not to overlap each other, the face frame processing unit 116 derives the barycentric coordinates of the two or more face regions 200. The face frame processing unit 116 derives the barycentric coordinates of each face region 200 and then derives the barycentric coordinates of two or more face regions 200 from the barycentric coordinates of each face region 200. If the barycentric coordinates of the face region 200 are located on the right side of this derived barycentric coordinates, the face frame 210 is displayed on the right side of the face region 200; if the barycentric coordinates of the face region 200 are located on the left side of the barycentric coordinates of the two or more face regions 200, the face frame 210 is displayed on the left side of the face region 200. In the example shown in FIG. 8, the face frame 210a is displayed on the left side of the face region 200a and tilted toward the left side; and the face frame 210b is located on the right side of the face region 200b and tilted toward the right side. This arrangement allows the face frame processing unit 116 to display two or more face frames 210 without overlapping with each other. It should be noted that a method of deriving the barycentric coordinates of two or more face regions 200 is not restricted to that mentioned above; for example, the barycentric coordinates of two or more face regions 200 may be derived by use of the central coordinates of each face region 200 or the horizontal barycentric coordinates of two or more face regions 200 may be derived by use of the left-end coordinates or the right-end coordinates of each face region 200.

It should be noted that what has been described so far is basically the processing for displaying an initial login screen. After the face frame 210 is displayed for each user, each user may move inside an imaged range. If this happens, the barycentric coordinates of each face region 200 change and then the barycentric coordinates of two or more face regions 200 change accordingly; however, if there is no overlapping between the face frames 210, the position of the face frame 210 set initially is maintained, namely, there is no change in the position of the face frame 210. If, after displaying the initial login screen, control is performed such that the display position of the face frame 210 is determined with reference to the horizontal axis coordinate value of the barycentric coordinates of two or more face regions 200 and, if the face region 200 of one user exists in the proximity of the horizontal axis coordinate value of the barycentric coordinates of two or more face regions 200, then repeating movements extending over the coordinate value from that position displays the face frame 210 alternately between the right side and the left side. In order to avoid such a situation, the face frame processing unit 116, if right-side display or left-side display of the face frame 210 with respect to the face region 200 is once determined, maintains the determined display position unless there occurs overlapping with another face frame 210.

Figure 9:
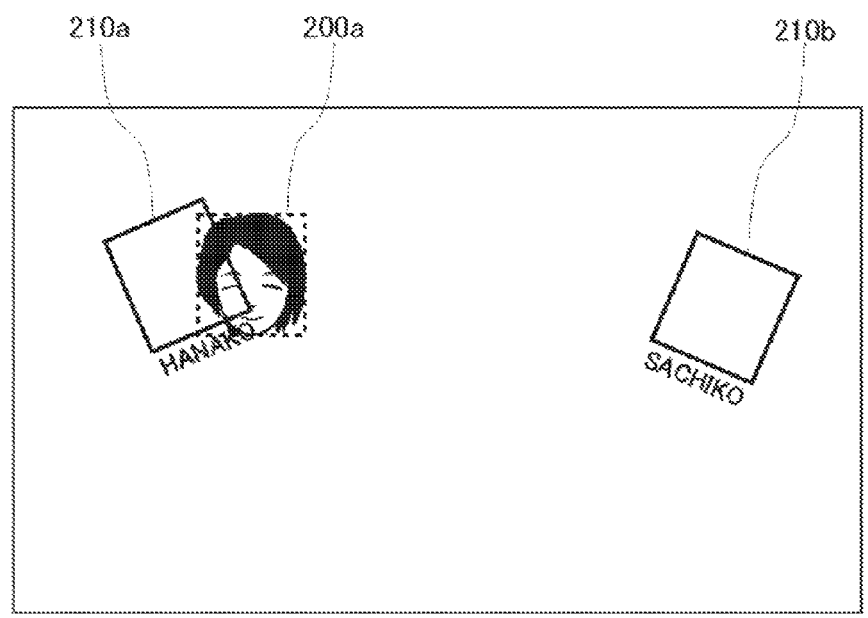
FIG. 9 is a diagram illustrating one example of a login screen transitioned from an initial login screen.

Referring to FIG. 9, there is shown one example of a login screen transitioned from the initial login screen. Here, for the convenience of description, the face image of user B is not shown; actually, however, the face of user B may be displayed in the login screen.

In this login screen, the face authentication unit 114 cannot detect user B in a taken image and therefore cannot set the face region 200b. Since undetection of user B is partially due to the face identification accuracy of the face authentication unit 114, even if the face authentication unit 114 cannot detect user B, it does not necessarily mean that user B has framed out of the camera 7. Therefore, even if user B is not detected by the face authentication unit 114 under predetermined conditions, the face frame processing unit 116 continues displaying the face frame 210b once displayed. Consequently, in the case where the face authentication unit 114 alternates between successful detection and unsuccessful detection of user B, the alternation between display and non-display of the face frame 210b can be avoided. It should be noted that, if the face authentication unit 114 detects the face image of user B in the face frame 210b, the login processing unit 120 may allow user B to log in. If the face frame processing unit 116 is notified by the face authentication unit 114 that user B has not been detected, the face frame processing unit 116 may make the display manner of the face frame 210b be different from that of the face frame 210a to which the face region 200a is set. For example, the face frame 210b may be displayed in a blinking manner. This allows user B to know that, even if he or she enters the face into the face frame 210b, user B cannot login in at that moment.

It has been described in the above that, even if user B is not detected, the face frame 210b is kept displayed under predetermined conditions. The following describes these predetermined conditions.

First, as one predetermined condition, in displaying the face frame 210 for two or more registered users, the face frame processing unit 116 restricts the number of face frames 210 to be displayed to a predetermined value. This is because it is difficult to display many face frames 210 on the output apparatus 4. Even if many face frames 210 can be displayed, it is predicted that a user's head tilting operation becomes difficult since the face frames 210 are too close to each other. Therefore, the upper limit of the number of face frames 210 is set four, for example, and even if five or more registered users are detected in a taken image by the face authentication unit 114, the face frame processing unit 116 displays the face frames 210 for four persons.

At this time, it is necessary for the face frame processing unit 116 to determine which user's face frame 210 is to be displayed. In order to provide the criterion for this determination, the priority determination unit 118 determines the priority in displaying of the face frame 210 for two or more image-taken registered users. This priority is determined as follows.

(a) First, the priority of the registered users included in the initial login screen is determined. If users A and B are included in the initial login screen, then the priority determination unit 118 may determine that the user A or B to be the first whichever is greater in the number of logins and the second whichever is smaller. For example, if the number of logins of user B is greater than that of user A, then user B is the first and user A is the second. It should be noted that the priority determination unit 118 may determine the priority of a user having the greater face region 200 to be higher. The priority determination unit 118 may make comparison between the areas of two or more face regions 200 set by the face authentication unit 114 to determine the priority of the user of the greater face region 200 to be higher. If the camera 7 is a stereo camera, the distance between the user and the camera 7 can be measured, so that the priority determination unit 118 may determine the priority of the user whose distance from the camera 7 is shorter to be higher.

(b) Next, the priority of a registered user included in the login screen after displaying of the initial login screen is determined to be higher. That is, the priority determination unit 118 determines the priority of a registered user newly imaged by the camera 7 to be the first and lowers the priority of a registered user already imaged by one step. Therefore, if user C is newly imaged by the camera 7, user C is the first, user B is the second, and user C is the third. Thus, the priority determination unit 118 sets the criterion of (b) over (a) and sets the priority of the user newly recognized by the face authentication unit 114 to be higher.

The priority determination unit 118 determines the priorities of the registered users imaged by the camera 7; assume here that as a result of new image-taking of users D and E, the priority of user B falls to the fourth. Then, at this moment, the priority of user A is the fifth and the face frame processing unit 116 displays the face frame 210 for users B, C, D, and E each set to one of the first through fourth. If user B is not detected by the face authentication unit 114, the face frame processing unit 116 erases the face frame 210b of user B and displays the face frame 210a of user A. The priority determination unit 118 drops the priority of the user not detected by the face authentication unit 114 to the lowest, thereby determining display priorities.

As described above, the priority determination unit 118 determines the priority for displaying the face frame 210 for two or more image-taken registered users and the face frame processing unit 116 displays the face frame 210 within the predetermined upper limit range in accordance with the priority determined by the priority determination unit 118.

As described above, the condition under which the face frame 210b is kept displayed in the login screen shown in FIG. 9 is that four or more registered users are not detected in this login screen; as long as such a condition is satisfied, the face frame processing unit 116 continues to display the face frame 210b.

Figure 10:
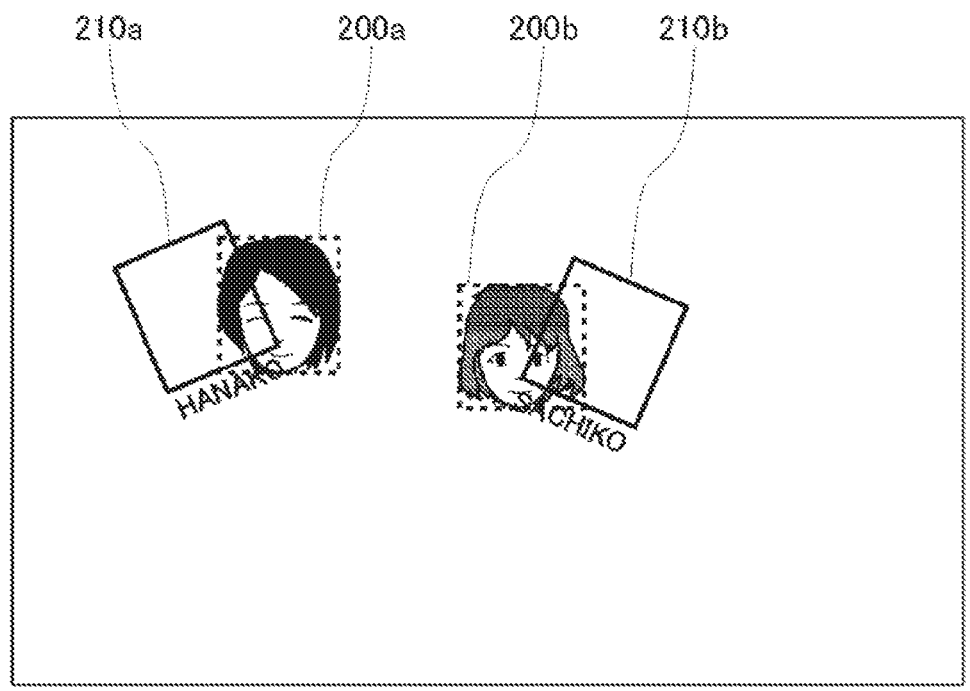
FIG. 10 is a diagram illustrating a manner in which a face frame follows a face movement of a user.

Referring to FIG. 10, there is shown a manner in which the face frame 210 follows the movement of a user face. A user is expected to do various movements within the image-taking range of the camera 7. One movement is for logging in, namely, a movement for putting the face into the face frame 210; separate from such a login operation, a user sometimes simply moves, sits down, and gets up, none of which being login operations.

If the movement of a user face is not a login operation, then the face frame processing unit 116 makes the face frame 210 follow the movement of the user face and displays the face frame 210 accordingly. The face frame processing unit 116 determines whether the movement of the barycentric coordinates of the face region 200 is in the direction in which the movement approaches to the barycentric coordinates of the face frame 210. At this moment, if the barycentric coordinates of the face region 200 are found moving in the direction of approaching the barycentric coordinates of the face frame 210, then the face frame processing unit 116 determines that the movement of the user face is a login operation and maintains the position of the face frame 210, namely does not change the position. On the other hand, if the barycentric coordinates of the face region 200 are found moving in the direction of leaving from the barycentric coordinates of the face frame 210, the face frame processing unit 116 determines that the movement of the user face is not a login operation and makes the face frame 210 follow the movement of the face region 200, displaying the face frame 210 accordingly. In the example shown in FIG. 10, the face of user B is moving leftward with the face frame 210 of user B getting out to the right side, so that the face frame processing unit 116 determines that the movement of the face of user B is not a login operation, thereby making the face frame 210b follow the movement of the face region 200b.

It should be noted that, as described before, the face frame 210 is displayed such that part thereof overlaps the face region 200. Hence, even if the positional relation between the face frame 210 and the face region 200 is slightly deviated, still the user is able to put the face into the face frame 210 with ease. Therefore, even if the face region 200 moves, as long as part of the face frame 210 is overlapped with the face region 200, the face frame processing unit 116 may not change the position of the face frame 210 and, when the overlapping is cleared, make the face frame 210 follow the face region 200.

In the configuration described above, the attention is directed to the user movements that are lateral relative to the camera 7; however, the user may move in the front-back direction relative to the camera 7. As the user moves toward the camera 7, the face image of the user gets larger in the login screen, while, when the user moves away from the camera 7, the face image of the user gets smaller in the login screen. If the change in the size of the face region 200 exceeds a predetermined ratio, the face frame processing unit 116 determines that the movement of the user face is not a login operation, upon which the face frame processing unit 116 may make the face frame 210 follow the movement of the user face and reset the size and display position of the face frame 210, thereby displaying the reset face frame 210. Thus, by making the face frame 210 follow not only the movement of the user face image in the lateral direction but also the movement of the user face image in the front-back direction and displaying the face frame 210 accordingly, the face frame processing unit 116 can facilitate for the user to execute a login operation.

Referring to FIG. 11(a), there is shown a state in which two face frames 210 are overlapping each other. This state is caused as a result of the movements of user A to the right direction and user B to the left direction relative to the camera 7 after the initial login screen is displayed. As described, the overlapping of two or more face frames 210 is not allowed, so that the face frame processing unit 116 must avoid the situation shown in FIG. 11(a).

Referring to FIG. 11(b), there is shown a state in which the face frame 210b of user B is arranged to the left side. The face frame processing unit 116 changes the arrangement of the face frame 210 in accordance with the priority specified by the priority determination unit 118. To be more specific, if two face frames 210 overlap with each other, the face frame processing unit 116 resets the position of the face frame 210 of the user having a lower priority such that this face frame 210 will not overlap the face frame 210 of the user having a higher priority. It has been already described that the priority determination unit 118 determines the priority in displaying the face frame 210 in accordance with the sequence of image-taken users and the size of the face region 200. Attention being directed to the size of the face region 200, the size of the face region 200 changes due to the front-back movement of the user. Therefore, the priority determination unit 118 sequentially sets priorities depending on the size of the face image at the moment. Here, because the face region 200a of user A is larger than the face region 200b of user B, the priority determination unit 118 sets the priority of the face frame 210a higher than the face frame 210b. Therefore, the face frame processing unit 116 displays the face frame 210b at a position where there is no overlap with the face frame 210a without moving the face frame 210a, thereby avoiding the overlap between the face frame 210a and face frame 210b.

It should be noted that if, as a result of relocating the face frame 210b to the left side of the face region 200b, there occurs an overlap with the face frame 210 of another user, comparison in priority is made with the face frame 210 of that another user. For example, if it becomes necessary to further relocate the face frame 210 but the relocation causes an overlap with the face frame 210 having higher priority or, as will be described later with reference to FIG. 12, causes partial getting out of the display, then the face frame processing unit 116 discontinues the displaying of that face frame 210.

Referring to FIG. 12(a), there is shown a state in which the face frame 210 partially gets out of the display in the login screen. As described with reference to the initial login screen, if the face frame processing unit 116 determines the display positions of the face frames 210a and 210b relative to the face regions 200a and 200b with reference to the barycentric coordinates of two or more face regions 200, the face frame 210a is arranged on the left side of the face region 200a. However, as shown in FIG. 12(a), the face frame 210a may partially get out of the display.

Therefore, if the face frame 210 partially gets out of the display and cannot be displayed in the entirety thereof, the face frame processing unit 116 displays the face frame 210 on the opposite side of the face region 200.

Referring to FIG. 12(b), there is shown a state in which the display position of the face frame 210 is changed. As shown, it is desirable for the face frame processing unit 116 to determine the display position of the face frame 210 such that the entirety of the face frame 210 is displayed on the display.

While one preferred embodiment of the present invention has been described using specific terms, such description is for illustrative purpose only, and it is to be understood by those skilled in the art that various changes and variations may be made in each component and a processing process or a combination thereof without departing from the spirit or scope of the present invention.

It was described that, in the embodiment, if, as a result of the computation of degree of matching by the face authentication unit 114, there are two or more ones whose degree of matching is 90 points or more, the face authentication unit 114 determines that the image-taken user is a registered user who derived a maximum point, upon which the face frame processing unit 116 displays one face frame 210 in the proximity of the face region 200. In a variation, if there are two or more users whose degree of matching exceeds 90 points, the face frames 210 for the top two users for example may be displayed.

Figure 13:
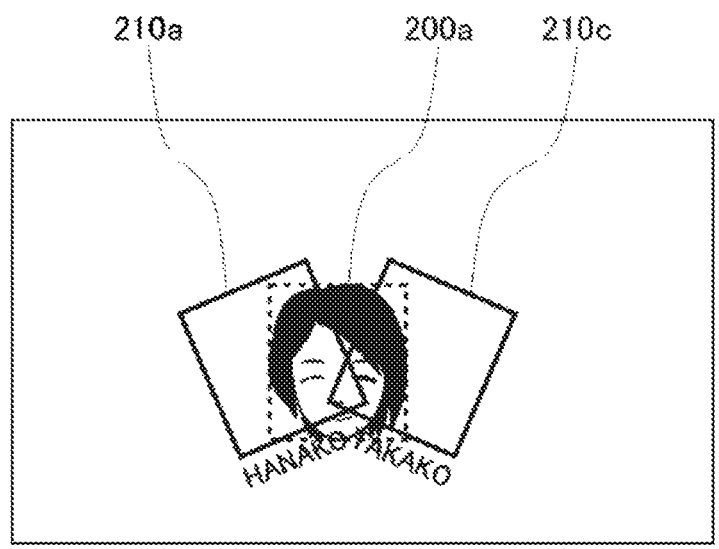
FIG. 13 is a diagram illustrating a login screen displaying two face frames at the left and the right of a face region.

Referring to FIG. 13, there is shown an example in which two face frames 210a and 210c are displayed on the left and right sides of the face region 200a. For example, if user A (online ID: HANAKO) and user C (online ID: TAKAKO) are twins and are both registered users, their faces often look alike. Therefore, the face frames 210a and 210c for two persons may be displayed to allow the user to select one of the face frames 210.

In FIG. 11(b), the face frame 210b is relocated on the left side of the face region 200b, the face frame 210a overlapping the face region 200b of user B. The face frame processing unit 116 may set the position of the face frame 210 such that not only the overlapping between the face frames 210 but also the overlapping between the face frame 210a and the face region 200b, namely, the face frame 210 of one user and the face region 200 of another user are avoided. In this case, the face frame processing unit 116 displays the face frame 210a on the right side of the face region 200a, thereby avoiding the overlapping between the face frame 210a and the face region 200b.

In addition, it has been described with reference to the embodiment that the face frame processing unit 116 displays the face frame 210 once for one registered user; it is also practicable to display the face frame 210 twice or more in order to secure the confirmation of login intention. For example, as shown in FIG. 8, if, after the face frame processing unit 116 displays the face frame 210a on the left side of user A, the face authentication unit 114 detects that the face image of user A is included in the face frame 210a, then the face frame processing unit 116 may display the face frame 210a again on the right side of user A. At this moment, if the face authentication unit 114 detects that the face image of user A is included in the face frame 210a displayed on the right side of user A, the login processing unit 120 lets user A log in. Thus, displaying twice or more the face frame 210a at different positions with respect to the face position of user A by the face frame processing unit 116 and detecting the face image of user A in each of the face frames 210a by the face authentication unit 114 enable the login processing unit 120 to surely allow user A having the intention of login to log in.

REFERENCE SIGNS LIST

1 . . . Information processing system, 4 . . . Output apparatus, 7 . . . Camera, 10 . . . Information processing apparatus, 20 . . . Main power button, 102 . . . Input receiving section, 104 . . . Image capture section, 110 . . . Login controller, 112 . . . Taken-image display unit, 114 . . . Face authentication unit, 116 . . . Face frame processing unit, 118 . . . Priority determination unit, 120 . . . Login processing unit, 130 . . . Registered user information holding section

INDUSTRIAL APPLICABILITY

The present invention is applicable to processing apparatuses configured to execute user face recognition.

The invention claimed is:

1. An information processing apparatus comprising:
a taken-image display circuit operating to display a taken image on a display;
a registered user information holding circuit operating to hold face identification data of registered users, the face identification data for each registered user including indicia identifying such registered user;
a face authentication circuit operating to detect a face image of a registered user existing in the taken image by use of the face identification data held in the registered user information holding circuit; and
a face frame processing circuit operating to display: (i) a face frame on the display for the detected registered user, such that the face frame is displayed proximate to, but not completely framing, an image of the face of the detected registered user, and (ii) the indicia identifying the detected registered user in association with the face frame,
wherein the face authentication circuit detects that the face image of the registered user is included in the face frame by use of the face identification data held in the user information holding circuit, wherein the face frame processing circuit operates to determine whether the detected registered user moves the face frame and the image of the face of the detected registered user relative to one another to completely frame the image of the face of the detected registered user, and wherein the face authentication circuit activates a login procedure in response to the determination being in the affirmative.

2. The information processing apparatus according to claim 1, wherein the face frame processing circuit arranges the face frame such that this face frame is partially overlapped with the face image of the registered user displayed on the display.

3. The information processing apparatus according to claim 1, wherein, if face frames are displayed for a plurality of registered users, the face frame processing unit displays a plurality of face frames such that the plurality of face frames are not overlapped with each other.

4. The information processing apparatus according to claim 1, wherein the face frame processing circuit determines a size of the face frame in accordance with a size of the face image of the detected registered user.

5. The information processing apparatus according to claim 1, wherein, if face frames are displayed for a plurality of registered users, the face frame processing unit restricts the number of face frames to be displayed to a predetermined value.

6. The information processing apparatus according to claim 1, further comprising:
a priority determination circuit operating to determine a priority in displaying face frames for a plurality of image-taken registered users,
wherein the face frame processing circuit displays face frames in accordance with the priority determined by the priority determination circuit.

7. The information processing apparatus according to claim 1, further comprising: a login processing circuit operating to, when the face authentication unit detects that a face image of a registered user is included in a face frame, let this registered user log in.

8. The information processing apparatus according to claim 1, wherein, if a movement of the face of a registered user is not a login operation, the face frame processing circuit makes a face frame follow the movement of the face of the registered user and displays the face frame accordingly.

9. A non-transitory, computer readable storage medium containing a computer program, which when executed by a computer, causes the computer to carry out actions, comprising:
   displaying a taken image on a display;
   storing face identification data of registered users, the face identification data for each registered user including indicia identifying such registered user;
   detecting a face image of a registered user existing in the taken image by use of the face identification data;
   displaying a face frame on the display for the detected registered user, such that the face frame is displayed proximate to, but not completely framing an image of, the face of the detected registered user;
   displaying the indicia identifying the detected registered user in association with the face frame;
   determining whether the detected registered user moves the face frame and the image of the face of the detected registered user relative to one another to completely frame the image of the face of the detected registered user; and
   activating a login procedure in response to the determination being in the affirmative.

10. A method, comprising:
    displaying a taken image on a display;
    storing face identification data of registered users, the face identification data for each registered user including indicia identifying such registered user;
    detecting a face image of a registered user existing in the taken image by use of the face identification data;
    displaying a face frame on the display for the detected registered user, such that the face frame is displayed proximate to, but not completely framing an image of, the face of the detected registered user;
    displaying the indicia identifying the detected registered user in association with the face frame;
    determining whether the detected registered user moves the face frame and the image of the face of the detected registered user relative to one another to completely frame the image of the face of the detected registered user; and
    activating a login procedure in response to the determination being in the affirmative.

* * * * *